United States Patent
Zhang (12)

(10) Patent No.: US 10,255,246 B1
(45) Date of Patent: Apr. 9, 2019

(54) SYSTEMS AND METHODS FOR PROVIDING A SEARCHABLE CONCEPT NETWORK

(71) Applicant: Zhu Zhang, Tucson, AZ (US)

(72) Inventor: Zhu Zhang, Tucson, AZ (US)

( * ) Notice: Subject to any disclaimer, the term of this patent is extended or adjusted under 35 U.S.C. 154(b) by 0 days.

(21) Appl. No.: 15/213,159

(22) Filed: Jul. 18, 2016

Related U.S. Application Data

(62) Division of application No. 14/203,292, filed on Mar. 10, 2014, now abandoned.

(60) Provisional application No. 61/775,286, filed on Mar. 8, 2013.

(51) Int. Cl.
   *G06F 17/30* (2006.01)
   *G06F 16/9535* (2019.01)
   *G06Q 30/02* (2012.01)

(52) U.S. Cl.
   CPC ..... *G06F 16/9535* (2019.01); *G06Q 30/0276* (2013.01)

(58) Field of Classification Search
   USPC ................ 707/609, 687, 711, 790, 813, 821
   See application file for complete search history.

(56) References Cited

U.S. PATENT DOCUMENTS

| | | | | |
|---|---|---|---|---|
| 2005/0080715 A1* | 4/2005 | McHale | ............. | G06Q 30/0601 705/37 |
| 2008/0281915 A1 | 11/2008 | Elad | ............................ | 709/204 |
| 2010/0262490 A1* | 10/2010 | Ito | .......................... | G06O 30/02 705/14.49 |
| 2011/0302149 A1* | 12/2011 | Vadlamani | ........ | G06F 17/30528 707/711 |
| 2013/0124321 A1* | 5/2013 | Yamane | ............. | G06Q 30/0259 705/14.57 |
| 2013/0144720 A1* | 6/2013 | Hari | ................... | G06Q 30/0241 705/14.55 |

OTHER PUBLICATIONS

U.S. Appl. No. 14/203,292, filed Mar. 10, 2014.
Office Action issued in U.S. Appl. No. 14/203,292, dated Apr. 18, 2016 (8 pgs).
Office Action issued in U.S. Appl. No. 14/203,292, dated Oct. 2, 2015 (8 pgs).

* cited by examiner

*Primary Examiner* — Sana A Al-Hashemi
(74) *Attorney, Agent, or Firm* — Hayes Soloway P.C.

(57) ABSTRACT

Systems and methods for providing a searchable concept network are provided. One such system includes a concept network application, which is hosted at least partially on a server. The concept network application may include or access an indexer for indexing text corpus. The text corpus is analyzed to extract concepts, as well as significance, relevancy and relationship information between concepts. The concepts and associated significance, relevancy and relationship information are utilized to construct a concept network, which is stored in one or more indexes or databases accessible to the concept network application. One or more user computer devices are provided access to the application, which receives a query from the user, and in response, provides the user with a relevant portion of the concept network. User behavior or interaction within the concept network may be detected and utilized in providing relevant advertisement information.

20 Claims, 4 Drawing Sheets

| HP Investors Face a Lonelier Road Ahead - Businessweek | How to Jailbreak an iPhone - Businessweek | Apple vs. Einhorn: Why the Investor Is Suing a Company He Loves - Businessweek | Apple took home 72% of all handset profits last quarter - Apple 2.0 - Fortune Tech | A Lack of R&D May Kill the 3D Printing Gold Rush - Businessweek | HP to limit student labor in China - Feb. 8, 2013 | Macmillan Settles U.S. Lawsuit Over E-book Prices - Businessweek |
|---|---|---|---|---|---|---|
| Michael Dell eats his words - Apple 2.0 - Fortune Tech | Bad review for Yelp. Inventors bail - The Buzz - Investment and Stock Market News | Apple CEO Tim Cook to be Obama's State of the Union guest - Feb. 11, 2013 | Apple iWatch doesn't scare Pebble - Feb. 11, 2013 | Which financial giant owns the biggest slice of Apple Inc.? - Apple 2.0 - Fortune Tech | Samsung plans to conquer Silicon Valley - Fotune Tech | Netflix stock: Fold this house of cards - The Buzz - Investment and Stock Market News |
| | Chart of the day: Apple's iPad climbs back to an 81% share - Apple 2.0 - Fortune Tech | HP mocks Dell buyout. Really, HP? - Feb. 5, 2013 | Dell plans to take company private - Feb. 5, 2013 | Apple's cash give-back plans: What the analysts are saying - Apple 2.0 - Fortune Tech | Report: Apple is ringing up iPhone sales in India - Apple 2.0 - Fortune Tech | Snapchat and the Erasable Future of Social Media - Businessweek |

FIG. 5

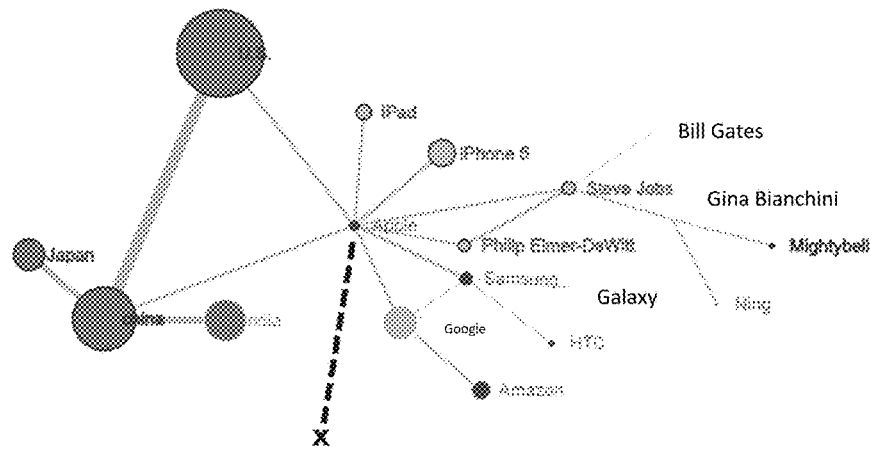

FIG. 6

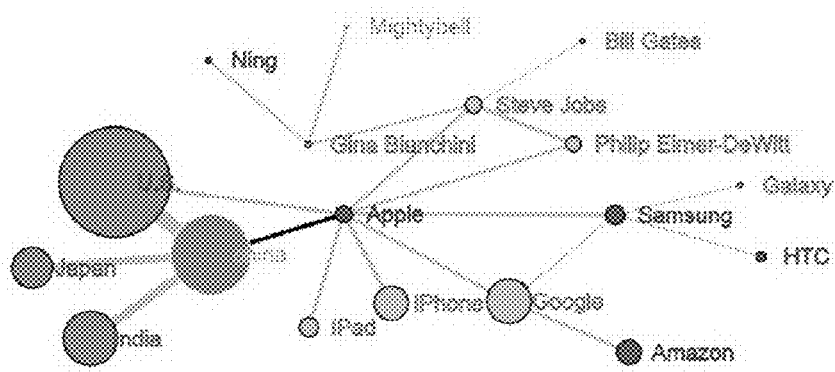

Current exploration focus: relation (Apple, China)
Low-priced iPhone Mini would double Apple's China market share
www.bizjournals.com/sanjose/news/2013/02/19/low-priced-iphone-mini-would-double.html
A new, lower priced iPhone could help Apple double...

Apple's China dilemma: market share or cachet? | Reuters
www.reuters.com/article/2013/01/24/us-apple-china-idUSBRE90N1AC20130124
Apple's best plan of attach remains securing a deal...

FIG. 7

SYSTEMS AND METHODS FOR PROVIDING A SEARCHABLE CONCEPT NETWORK

CROSS-REFERENCE TO RELATED APPLICATION

This Application is a divisional of U.S. patent application Ser. No. 14/203,292, filed Mar. 10, 2014, which claims priority from U.S. Provisional Application No. 61/775,286, filed Mar. 8, 2013.

FIELD OF THE DISCLOSURE

The present disclosure is generally related to searching and advertising in a semantic space backed by large data repositories, and more particularly is related to systems and methods for providing a searchable concept network, having concepts or entities represented in the network based on significance, relevancy and relationships with other concepts or entities.

BACKGROUND OF THE DISCLOSURE

The central challenge in "search" (as in "search engines") has been to find the "relevant" documents in response to the user query. The dual problem is the online advertising problem, in which the central challenge is to find the best match between a given user in a given context and suitable advertisements. Similar computational models are typically used in both matching processes, e.g., the Boolean model or the vector space model. The marriage between search and advertising gives rise to the so-called "sponsored search," in which ads co-occur with search results on the same display. However, there is an ongoing need for providing more relevant results to a user inquiry, and more targeted and effective advertising in an online or computerized environment.

Thus, a heretofore unaddressed need exists in the industry to address the aforementioned deficiencies and inadequacies.

SUMMARY OF THE DISCLOSURE

Embodiments of the present disclosure provide systems and methods for providing a searchable concept network. In accordance with the purposes of the present invention, as embodied and broadly described herein, the present disclosure generally provides systems and methods to extract a concept network, quantify importance of entities/relations, conduct exploratory search, and generate the context for graphical and textual ads.

In one embodiment, a system is configured to provide a concept network having entities, which can carry properties such as name, type, significance, etc., and relations, which can carry properties such as name, type, direction, strength, etc.

A method is provided to identify candidate concepts in the concept network, which can be implemented as, but not limited to: all (or a subset) of the terms and phrases in the documents; a predefined (and possibly modifiable) gazetteer, and a set of entities identified by pre-trained machine learning models.

A method is provided to identify relations between concept pairs and further quantify their strength, through entity co-occurrence statistics and therefrom derived statistical measures, pre-trained machine learning models or other computational techniques Methods are further provided to index the occurrence and location of concepts in documents, to index the occurrence and location of relations in documents, and to construct the concept network using associations and/or information resulting from, for example, identifying candidate concepts, identifying relations between concepts, indexing the occurrence and location of concepts and indexing the occurrence and location of relations.

A method is provided (the "EntityRank" algorithm) to compute the significance of concepts based on the structure of the concept network. In an embodiment, the significance of one concept is a function (of any conceivable form) of the type/significance of all neighbor concepts and the type/strength of all neighbor relations.

A method is provided to compute a "relevant" concept network in response to a user query. For example, when the user queries "Apple", a relevant network is returned and displayed.

A method is provided to capture user intent and interest by recording his/her behavior in the presentation space (e.g., the relevant concept map).

Methods are provided to disambiguate entities based on entity properties and semantic contexts, to merge and resolve entities based on entity properties and semantic contexts, and to cluster entities based on entity properties and semantic contexts.

A method is provided to render a concept network as a navigable graph, where visual effects such as, but not limited to, the size/shape/color of the nodes and width/length/directionality/color of the links all carry semantic meanings.

A method is provided to render the entity-specific or relation-specific information in a list of items, comprising title, URL, abstract, etc.

A method is provided to render the entity-specific or relation-specific information as a treemap containing condensed in formation about subjectivity relevance of the corresponding articles.

A method is provided to display the exploratory space (e.g., the concept network), the focal entity/relation, and the focus-specific information in an integrated fashion.

A method is provided to compute and index ads features based on user behavior patterns in the presentation space, which may include: temporal and spatial properties of user browsing behavior; temporal and spatial properties of user clicking behavior; and content of entity/relation-specific information.

Methods are further provided to retrieve sponsored-search ads from the ad index by evaluating matching user intent/interest features and ads features, to render sponsored-search ads in a separate pane, and to run auction for the sponsored-search ads.

A method is provided to compute and render featured-search (or "sponsored exploration") results in the concept network. In featured search, an advertiser pays to be displayed in a desirable context or neighborhood in the concept network (e.g., being closer to an entity of interest). And methods are provided to run auction for the featured-search results.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 shows a sample sentiment treemap, in accordance with an exemplary embodiment of the present disclosure.

FIG. 6 illustrates an interactive map including a "sponsored exploration" feature for use in advertising, in accordance with an exemplary embodiment of the present disclosure.

FIG. 7 illustrates a further exemplary integrated interface facilitating both exploration and exploitation for information seeking, in accordance with an exemplary embodiment of the present disclosure.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many embodiments of the disclosure may take the form of computer-executable instructions, including algorithms executed by a programmable computer. However, the disclosure can be practiced with other computer system configurations as well. Certain aspects of the disclosure can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers) and the like.

The disclosure also can be practiced in distributed computing environments, where tasks or modules are performed by remote processing devices that are linked through a communications network. Moreover, the disclosure can be practiced in Internet-based or cloud computing environments, where shared resources, software and information may be provided to computers and other devices on demand. In a distributed computing environment, program modules or subroutines may be located in both local and remote memory storage devices. Aspects of the disclosure described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks including the cloud. Data structures and transmissions of data particular to aspects of the disclosure are also encompassed within the scope of the disclosure.

Figure 1:
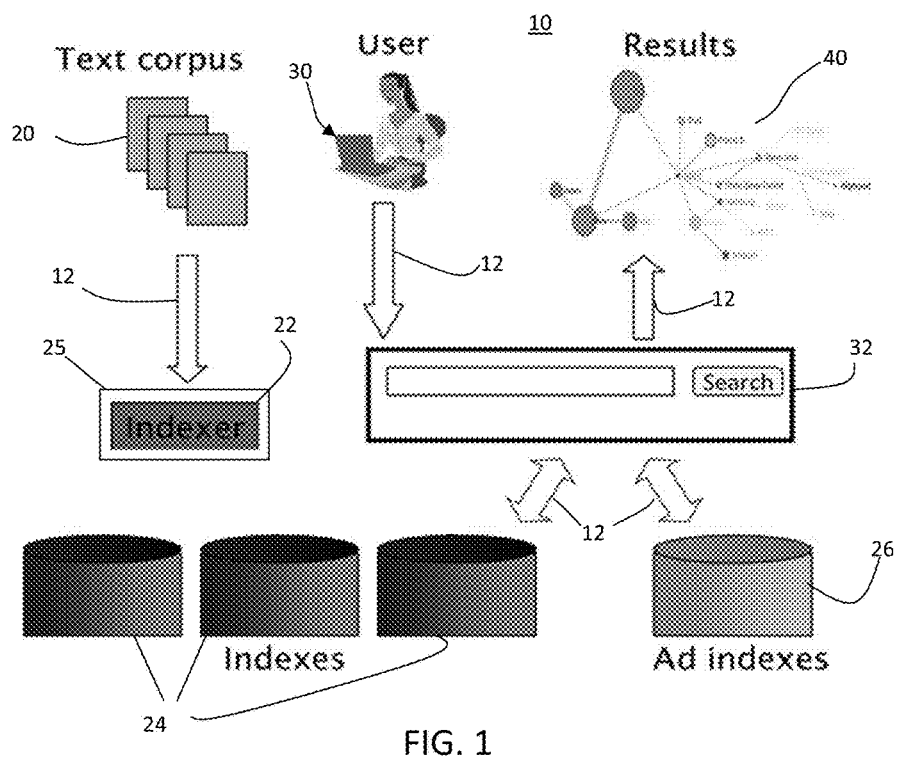
FIG. 1 is a block diagram illustrating a system for providing an electronic searchable concept network, in accordance with a first exemplary embodiment of the present disclosure.

FIG. 1 is a schematic illustration of a system for providing an electronic searchable concept network 10, in accordance with a first exemplary embodiment of the present disclosure. The system for providing an electronic searchable concept network 10, which may also be referred to as 'system 10', includes a concept network application 25 (which may be referred to as 'application 25'), electronically accessible over at least one network system 12 and hosted at least partially on a server. The application 25 may include or otherwise access an indexer 22 for indexing text corpus 20 for use in the system 10. A user computer device 30 may be positioned to access the application 25 (as shown in FIG. 1, the user may access the application 25 via a graphical user interface, which may include a search feature 32).

The application 25 is hosted at least partially on a server, which may be or include any database capable of storing and/or providing access to information, such as an electronic database, a computer and/or computerized server, database server or generally any network host capable of storing data and connected to any type of data network. Further, the server may include or be a part of a distributed network or cloud computing environment. Any type of electronic and/or computerized device that is capable of storing information may be included as the server, and is considered within the scope of this disclosure. The server may include computer-readable storage media, and a processor for processing data and executing algorithms, including any of the processes and algorithms set forth in this disclosure. The concept network application 25 is electronically accessible over at least one network system 12. The network system 12 may include any type of network infrastructure, such as the Internet, or any other wired, wireless and/or partially wired network. The server, application 25 and network system 12 may include a variety of hardware and software components to provide successful functioning of the server and the application 25, as is well-known within the art. Further, any features, characteristics, designs and/or functions that are known within the art may be included with the system 10 to further enhance its efficiency.

The user computer device 30 may be any device that is capable of communicating with the application 25, for example via a network system 12, and may be operated by any user of the system 10, and particularly those users who use the system 10 to interact with the concept network (e.g., by searching, viewing, browsing, etc.) provided by the system 10. Any number of user computer devices 30 may use the system 10 at any given time.

The concept network application 25 may be fully or partially hosted on a server. The application 25 may include any tool, device, system, process or combination thereof, which assists or makes possible the construction of a concept network and providing access of users to the constructed concept network. For example, the application 25 may construct the concept network through interaction with the indexer 22, which analyzes text corpus 20 to determine concepts within the text corpus 20, as well as relationships between concepts. A user may access the concept network, for example, through a search feature 32 provided by the application 25. The application 25 may include any computer-readable memory or databases, which may be stored in any computer-readable medium, and may be accessible by a computer processor. The application 25 may further include or access computer program instructions which may cause a processor to perform any algorithms and/or functions which may be described in this disclosure.

The system 10 further includes one or more indexes 24, which may be, for example, one or more databases for storing the concept network, relationships between concepts within the network, properties of concepts in the network, relevancy of concepts, as well as any other attributes of concepts and/or the concept network pertinent to the systems and methods provided herein. The application 25 and/or indexer 22 has access to the indexes 24, which may be fully or partially hosted on the server, or may be hosted elsewhere and otherwise accessible to the application 25 and/or indexer 22.

The application 25 may include or provide access to a web or network-based software platform, including a graphical user interface or webpage which provides interactive access to the system 10 to a user of a user computer device 30. Alternatively or additionally, a user computer device 30 may include software for providing access to the system 10.

The system 10 further includes one or more ad indexes 26. The application 25 has access to the ad index 26, which may one or more databases and may be fully or partially hosted on the server, or may be hosted elsewhere and otherwise accessible to the application 25. The ad index 26 stores indexed advertising information, which may be associated with concepts, relationships, paths, or any other meaningful patterns, in the concept network constructed and stored, for example, in indexes 24.

In an embodiment, the system 10 may be described as follows. A set of servers run on the backend to compute the concept network (e.g., by analyzing text corpus 20), store and index it in a database engine (e.g., indexes 24). At application time, end users access the service (e.g., application 25, which may be hosted on one or more servers) from client computers (e.g., user computer 30), through http or any other network protocol. The system 10 may facilitate different levels of access to different types of users. For example, power users can also gain direct access to the data on the servers through authenticated channels.

Figure 3:
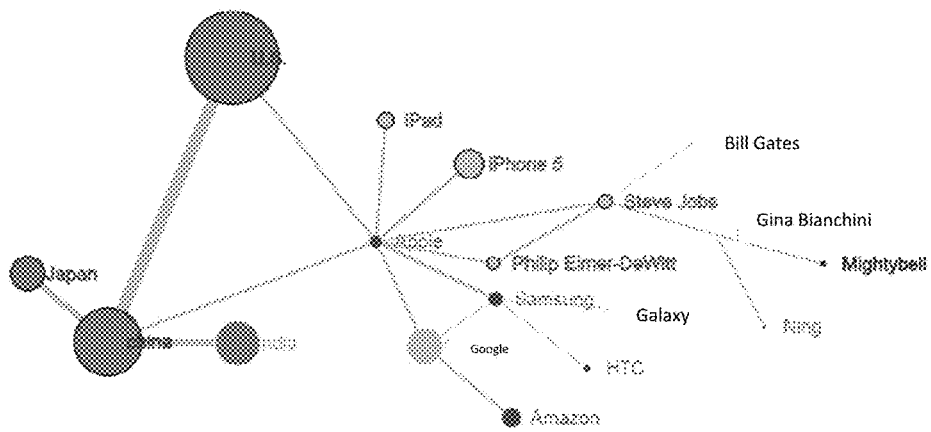
FIG. 3 illustrates a sample concept network portion, displayed as an interactive map in response to a user search, in accordance with an exemplary embodiment of the present disclosure.
Figure 4:
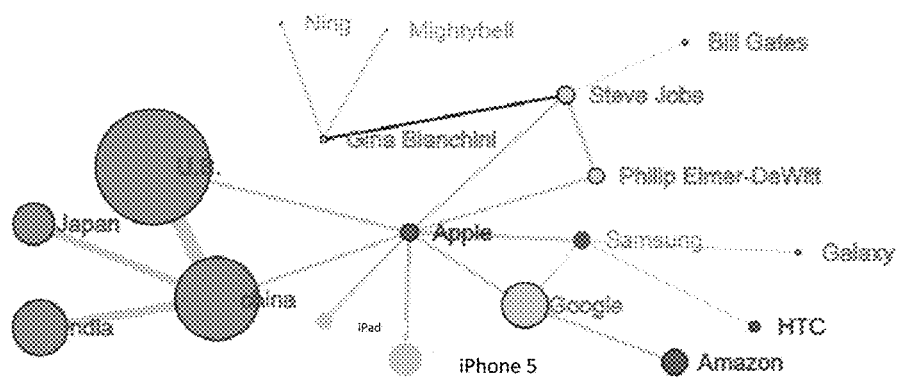
FIG. 4 illustrates an integrated interface facilitating both exploration and exploitation for information seeking, in accordance with an exemplary embodiment of the present disclosure.

The system 10 may be operated to perform a concept network search, as follows. A user (e.g., using user computer 30) types a query (e.g., "Apple") in the search feature 32 provided by the application 25. The system 10 first finds a matching concept (e.g., by matching the searched term with one or more concepts stored in the indexes 24), which now becomes the focus, in the concept space already computed and indexed. The application 25 then provides, graphically displayed as a result of the search, a relevant portion of the overall concept network, which in one embodiment may be rendered as an interactive map or graph 40 showing a general neighborhood (with customizable parameters such as size) around the focal concept. The user may then interactively navigate the map 40 using map-like operations (e.g., clicking, rolling-over, zooming in/out, etc.). Every time a concept or relationship is being fixated on or otherwise interacted with (e.g., which may be detected through user behavior such as position of mouse or other pointing device, clicking, rolling-over, etc.), corresponding relevant information will be displayed (e.g., in an info pane, in one embodiment). Relevant advertisements (e.g., based on associations between advertising information in ad indexes 26 and concepts in indexes 24) may also be displayed (e.g., in a separate ad pane, in one embodiment). FIG. 3 illustrates a sample concept network provided in response to the query term "Apple," and FIG. 4 illustrates a sample integrated interface that displays the exploration space (e.g., the concept network), highlights the current focus (e.g., "Apple"), and provides the focus-specific information (e.g., "Apple"-related).

The systems and methods provided herein operate on any dataset (e.g., text corpus 20) comprising any number of text documents, which may be collected from the World Wide Web, or from other sources (such as patent documents from USPTO). The text corpus 20 may include documents of any size, origin and genre. The documents may be preprocessed by standard procedures such as HTML tag removal, stemming, etc.

Figure 2:
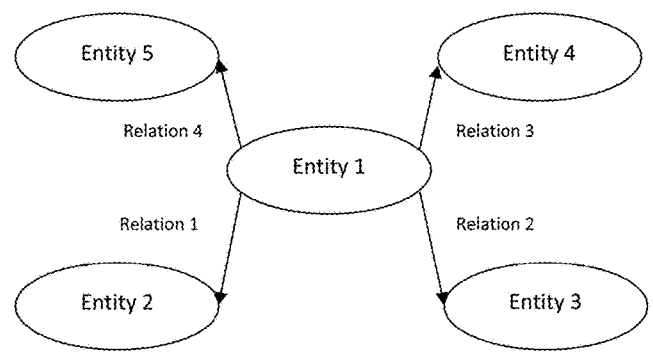
FIG. 2 illustrates an abstract representation of a portion of the concept network, showing entities or "concepts" and relations between them, in accordance with an exemplary embodiment of the present disclosure.

In general, the invention may operate on any dataset that has the following components: a collection of entities (or "concepts"), a collection of relationships between entities, and for each entity/relationship, the set of corresponding relevant data objects. FIG. 2 illustrates a sample concept network, having a central concept (Entity 1) which is related to other concepts (Entities 2 through 5) by graphically depicted relationships (Relations 1 through 4).

The concept space includes all the semantic concepts existing in the document collection (e.g., the text corpus 20). Generally speaking, the concepts are extracted by processing the text (e.g., by processing text corpus 20 by the application 25 and/or indexer 22) using state-of-the-art natural language processing tools.

In one embodiment, the concepts are all the noun phrases in the text, and each concept has a type that is indicated by its semantic category (e.g., based on WordNet). In another embodiment, the concepts are the named entities, classified by types such as location, person, organization, etc.

Each concept is assigned a significance measure, based on statistics such as the term frequency, document frequency, or some function thereof. In a further embodiment, the significance can be derived from the concept network. The concept network is stored in indexes 24, including the concepts, as well as all the information associated with the concepts, such as the significance measures of concepts, relationships and relevancy between concepts, and so on.

Relationships exist between concepts. The relationships may be computed by natural language processing techniques (e.g., performed by the application 25 and/or indexer 22). In one embodiment, undirected, un-typed relationships exist between pairs of entities (or concepts). If a pair of entities e1 and e2 co-occur in a given linguistic context (e.g., a sentence, a paragraph, or a document), the system 10 may track the occurrence statistics, such as the pair frequency pf (number of times the pairs co-occur) and the context frequency cf (number of contexts in which the pairs co-occur). The significance of the relationship can be quantified by pf, cf, the mutual information measure or some other function derived from pf and cf. These measures of the significance of the relationship between the entities e1 and e2 are associated with the entities and included in the concept network stored in indexes 24.

In a further embodiment, typed and possibly directed relationships exist between pairs of entities, and are computed and associated with such entities in the concept network. The types carry semantic meaning and may be directional (e.g., RESIDE_IN, FRIEND_WITH, etc.). The identification of such relationships relies on the combination of linguistic knowledge and machine learning models. The significance of such relationships are based on pf, cf, and the confidence score of the identification model.

A concept network can be built, with each concept as a node, and the relationships as edges. Multiple edges can exist between a pair of concepts.

Given the concept network, the system 10 may utilize "ConceptRank" or "EntityRank" algorithms to compute the significance of concepts based on the structure of the concept network. In one embodiment of the algorithm, the significance of one concept is a function (of any conceivable form) of the type/significance of all neighbor concepts and the type/strength of all neighbor relations. An initial score vector is iteratively updated by a matrix, and the convergent state represents the ConceptRank scores of all concepts.

When the application 25 receives a user query (e.g., as text input into search feature 32), the query is first parsed into a concept or set of concepts, by applying shallow parsing techniques. The query interface (e.g., search feature 32) may include any known query parsing and/or analytic techniques, and may also allow custom delimitation using predetermined punctuation marks (e.g. ";").

In one embodiment of the retrieval algorithm, given a single-concept query, a node x in the graph (e.g., in the concept network stored in indexes 24) that best matches the query concept is first identified, using string similarity or similar techniques. Then a neighborhood of x is computed, based on a pre-specified radius parameter r (which may be customizable by users), by retrieving all nodes that are within distance r from x and including all relevant 13 edges.

In another embodiment of the retrieval algorithm, given a multi-concept query (x1, x2, . . . xn), a path p that connects all nodes (x1 to xn) of the queried concepts in the graph is first identified, using string similarity or similar techniques. In the case of non-existence of such path, partial paths are identified. Then a neighborhood of path p is computed, based on a pre-specified radius parameter r (customizable by users), by retrieving all nodes that are within distance r from nodes on p and including all relevant edges.

The displayed result is a graph or map, i.e., a sub-universe of the entire concept graph stored and indexed (e.g., in indexes 24) by the system 10. Once properly rendered and displayed to the user, the user is free to navigate the space and thus leave traces (e.g., by user interaction with the displayed map 40). Such user interaction may serve as a basis for ad targeting and serving.

The concept network also enables the solution of the polysemy and synonymy problems in information retrieval, by providing a powerful context space.

Entities (or concepts) may be disambiguated (e.g., by the application 25 and/or indexer 22) based on entity properties and semantic contexts. For example, the term "apple" could refer to a technology company or a type of fruit. Further, entities may be merged and resolved based on entity properties and semantic contexts. For example, the terms "IBM" and "Big Blue" may refer to the same entity. Entities may also be clustered based on entity properties and semantic contexts. For example, the terms "Apple", "Steve Jobs" and "iPhone" may belong to the same cluster even though they do not refer to the same thing.

The presentation/visualization techniques disclosed herein provide powerful tools that facilitate both exploration and exploitation in user information seeking behavior.

Though the underlying concept graph (constructed and stored, e.g., in indexes 24) is not displayed in its entirety to the user, given its sheer size, every result graph in response to a user query is rendered as a navigable graph, where visual effects such as, but not limited to, the size/shape/color of the nodes (e.g., representing "concepts") and width/length/directionality/color of the links (e.g., representing "relationships") may carry semantic meanings and may be displayed (as shown, for example, in FIG. 3). The user may explore and interact with the graph in a way that is similar to exploring a map. All standard operations apply, for example, clicking objects (nodes and edges), zoom in/out, shifting focus, etc. In a further embodiment, all standard touch-based operations apply, as in popular touch devices.

Upon the user clicking an object (node or edge) in the graph, the entity-specific or relation-specific information in a list of items, comprising title, URL, abstract, etc. will be rendered and displayed in a separate panel (a different display area on the side/top/bottom of the screen). This feature is illustrated, for example, in FIGS. 4 and 7.

In another embodiment, shown in FIG. 5, the entity-specific or relation-specific information may be rendered as a treemap containing condensed information about subjectivity relevance of the corresponding articles. The size and color of the blocks may indicate semantic counterparts such as relevance and sentiment strength.

As shown, for example in FIGS. 4 and 7, the system 10 may display the exploratory space (e.g., the graph or map of the relevant portion of the concept network), the focal entity/relation, and the focus-specific information in an integrated fashion.

The problem of ad targeting and serving is the opposite side of the same coin of information retrieval: given an approximation of user intent, retrieve the most relevant ads, in the sense of matching potential user purchase needs. The success of ad serving is typically measured by click through rate and conversion rate. Systems and methods provided by the present disclosure, are not only capable of facilitating user information seeking behavior, but also include and/or facilitate a powerful ad platform, due to the extended session time and richer cues of user intent.

Utilizing system 10, advertisement features may be computed and indexed based on user behavior patterns in the presentation space described above (e.g., the interactive map 40), which may include: temporal and spatial properties of user browsing behavior; temporal and spatial properties of user clicking behavior; and content of entity/relation-specific information.

In one embodiment, the advertiser specifies the serving environment of its ad as the combination of the nodes/edges in the neighborhood graph, the nodes/edges clicked by the user, and the node/edge-specific information (in the separate panel) exploited by the user. Such specifications may be associated with the ad and stored in ad indexes 26. In a similar vein, user intent is captured by the vector with the same components. The ad serving is essentially a matching process between the user intent and ad profile, computationalized by known similarity functions such as cosine similarity, Jaccard index, or a machine-learned statistical method that outputs a normalized score. We name this context-oriented ad serving.

Context-oriented ads may be rendered in a separate pane, in a presentation similar to the entity/relationship-specific information as shown, for example, in FIG. 7.

In another embodiment (e.g., shown in FIG. 6 as "sponsored exploration"), the advertiser pays to be displayed in a desirable context or neighborhood in the concept network (e.g., being closer to an entity of interest).

In the presence of multiple advertisers competing for similar advertising environments (defined as the neighborhood graph in context-oriented ads, or the focal target in sponsored exploration), auctions can be run through system 10 to maximize the platform's profitability. Possible auction mechanisms include Vickrey, Dutch, and any other known variations. In one embodiment, the generalized second-price (GSP) auction is run, where the advertiser in position i pays a price per click equal to the bid of the advertiser in position (i+1) plus a minimum increment.

The systems and methods provided by the present disclosure provide tremendous utility to all key players in the online search and advertisement ecosystem. The search users (hence potential ad consumers) enjoy greater utility through exploring a non-linear semantic space (with the option to drill down) and possibly encountering serendipity. The advertisers achieve greater return-on-investment through a more powerful set of targeting vehicles. The search platform (and the ad platform at the same time) better serves information seekers by facilitating both exploration and exploitation behaviors, and it also achieves higher revenue per impression/search through better understanding and richer representation of user intent/interest, hence more relevant ad serving.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A method for providing a searchable concept network from said searchable content stored on a server, said searchable content having entities represented in the network, said concept network having relationships between said entities based on at least one of significance and relevancy, wherein said concept network is a navigable graph, the method comprising:
   extracting, via a processor of a server, said concept network from said searchable content;
   quantifying the importance of at least one of said entities and relations thereof;
   conducting an exploratory search of said concept network based on user query from a user and taking into account the importance of said at least one of said entities and relations thereof so as to establish at least one concept and its neighborhood in said concept network;
   generating the content corresponding to said established concept and its neighborhood;
   identifying at least one of a graphical and textual commercial advertisement material provided by an advertiser, wherein the graphical and textual commercial advertisement material is a context-oriented ad which is contextually relevant to the content associated with said established concept and its neighborhood based on an advertiser-specified serving environment of the context-oriented ad, wherein the advertiser-specified serving environment includes at least one of: advertiser-specified nodes in the navigable graph, advertiser-specified edges in the navigable graph, nodes in the navigable graph traversed by the user, or edges in the navigable graph traversed by the user;
   displaying, on said user computing device, said at least one of the graphical and textual commercial advertisement material in a position within the navigable graph, wherein the position is adjacent to the content embodying said established concept and neighborhood, whereby a position of the graphical and textual commercial advertisement material within the navigable graph is modifiable by the advertiser.

2. A method for providing a searchable concept network from said searchable content stored on a server, said searchable content having entities represented in the network, said concept network having relationships between said entities based on at least one of significance and relevancy, wherein said concept network is a navigable graph, the method comprising:
   extracting, via a processor of a server, said concept network from said searchable content;
   quantifying the importance of at least one of said entities and relations thereof;
   conducting an exploratory search of said concept network based on user query from a user and taking into account the importance of said at least one of said entities and relations thereof so as to establish at least one concept and its neighborhood in said concept network;
   generating the content corresponding to said established concept and its neighborhood;
   identifying at least one of a graphical and textual commercial advertisement material provided by an advertiser, wherein the graphical and textual commercial advertisement material is a context-oriented ad which is contextually relevant to the content associated with said established concept and its neighborhood based on an advertiser-specified serving environment of the context-oriented ad, wherein the advertiser-specified serving environment includes at least one of: advertiser-specified nodes in the navigable graph, advertiser-specified edges in the navigable graph, nodes in the navigable graph traversed by the user, or edges in the navigable graph traversed by the user;
   displaying, on said user computing device, said at least one of the graphical and textual commercial advertisement material in a position within the navigable graph, wherein the position is adjacent to the content embodying said established concept and neighborhood; and
   modifying, by the advertiser, the position of the graphical and textual commercial advertisement material within the navigable graph.

3. The method of claim 1, wherein said entities include properties of at least one of: name, type and significance; and name, type, direction and strength.

4. The method of claim 1, wherein said established concepts are derived using at least one of phrases in said searchable content, a gazetteer, and pre-trained machine learning models, wherein said relations are established by identifying relations between concept pairs, and, wherein said identification and quantification of relations between concept pairs is established by one of entity co-occurrence and therefrom derived statistical measures, and pre-trained machine learning models.

5. The method of claim 1, and further including indexing the occurrence and location of concepts in said searchable content, said indexing being used to expedite search in the said concept network.

6. The method of claim 1, wherein relevance is determined in response to a user query.

7. The method of claim 1, and further including
   (a) capturing user intent and interest by recording user behavior as the user reacts to the display of said searchable content, or (b) disambiguating entities based on entity properties and semantic contexts, or (c) merging and resolving entities based on entity properties and semantic contexts, or (d) clustering entities based on entity properties and semantic contexts.

8. The method of claim 1, wherein said navigable graph is rendered to display visual effects including at least one of size, shape, and color of the nodes on the graph and at least one of: width, length, directionality, color, and semantic meaning of the links between said nodes, including type and strength.

9. The method of claim 1, wherein at least one of: entity specific and relations specific information is rendered as a list of items, including one of titles, URLs and abstracts.

10. The method of claim 1, wherein said concept network is displayed in which the established concept in terms of at least one of: a focal entity and relation and focus-specific information is displayed in an integrated fashion.

11. The method of claim 1, and further including computing and indexing ads features based on user behavior patterns, said user behavior patterns including at least one of temporal and spatial properties of user browsing behavior, temporal and spatial properties of user clicking behavior, and the content of at least one of: entity and relation specific information.

12. The method of claim 1, wherein the indexing of ads results in an ad index and wherein context-oriented ads are retrieved from the ad index by evaluating at least one of: matching user intent, interest features, and ad features, through at least one of: cosine similarity, Jaccard index, and a machine-learned statistical that outputs a normalized score.

13. The method of claim 1, and further including employing an entity rank algorithm to compute the significance of concepts based on the structure of said concept network.

14. The method of claim 1, and further including computing and indexing user intent and interest based on user behavior patterns, said user behavior patterns including at least one of temporal and spatial properties of user browsing behavior, temporal and spatial properties of user clicking behavior, and the content of at least one of: entity and relation specific information.

15. The method of claim 5, wherein said concept network utilizes associations and information resulting from identifying concepts, identifying relations between said concepts, indexing the occurrence and location of concepts and indexing the occurrence and location of relations.

16. The method of claim 9, wherein said list of items is in the form of a tree map containing condensed information about subjectivity relevance of the corresponding articles.

17. The method of claim 12, wherein said at least one of: matching user intent and interest features are utilized to render context-oriented ads in a separate pane of said display.

18. The method of claim 12, and further including the step of running an auction for the sponsored ads.

19. The method of claim 13, wherein said significance includes the significance of all neighbor concepts in the type and strength of all neighboring relations.

20. The method of claim 18, wherein said sponsored ads are displayed in the neighborhood of said established concept.

* * * * *